United States Patent
Griffin

(10) Patent No.: US 12,099,426 B2
(45) Date of Patent: Sep. 24, 2024

(54) TELEMETRY DATA FILTER FOR ALLOCATING STORAGE RESOURCES

(71) Applicant: Oracle International Corporation, Redwood Shores, CA (US)

(72) Inventor: Joshua Deen Griffin, Wexford, PA (US)

(73) Assignee: Oracle International Corporation, Redwood Shores, CA (US)

( * ) Notice: Subject to any disclaimer, the term of this patent is extended or adjusted under 35 U.S.C. 154(b) by 298 days.

(21) Appl. No.: 17/452,459

(22) Filed: Oct. 27, 2021

(65) Prior Publication Data

US 2023/0128199 A1      Apr. 27, 2023

(51) Int. Cl.
  *G06F 11/30*  (2006.01)
  *G06F 9/50*  (2006.01)
  *G06F 11/34*  (2006.01)

(52) U.S. Cl.
  CPC ........ *G06F 11/3051* (2013.01); *G06F 9/5005* (2013.01); *G06F 11/3075* (2013.01); *G06F 11/3409* (2013.01); *G06F 11/3419* (2013.01)

(58) Field of Classification Search
  CPC .............. G06F 11/3051; G06F 9/5005; G06F 11/3075; G06F 11/3409; G06F 11/3419
  See application file for complete search history.

(56) References Cited

U.S. PATENT DOCUMENTS

| | | | | |
|---|---|---|---|---|
| 7,110,913 B2* | 9/2006 | Monroe | ................ | G06F 11/008 709/224 |
| 9,378,056 B2* | 6/2016 | Oda | ..................... | G06F 9/5088 |
| 9,864,636 B1* | 1/2018 | Patel | ....................... | H04L 47/70 |
| 10,896,073 B1* | 1/2021 | Jain | ..................... | G06F 11/0793 |
| 11,188,391 B1 | 11/2021 | Sule | | |
| 11,360,821 B1* | 6/2022 | Dey | ....................... | G06F 9/505 |
| 2005/0132362 A1 | 6/2005 | Knauerhase et al. | | |
| 2006/0277307 A1 | 12/2006 | Bernardin et al. | | |
| 2008/0184250 A1 | 7/2008 | Hamadi et al. | | |
| 2010/0057518 A1 | 3/2010 | Naveh et al. | | |

(Continued)

OTHER PUBLICATIONS

"Oracle Advanced Constraint Technology," R&D Group, pp. 1-2.
C. Bessiere, "Constraint Propagation," F. Rossi, P. van Beek, T. Walsh (Eds.), Handbook of CP, 2006, pp. 1-63.
D Meier, "Resource Allocation in Clouds," Communication Systems VII, Chapter 1, Stiller, B., et al., eds., University of Zurich, Jun. 2014, pp. 1-57.

(Continued)

*Primary Examiner* — Benjamin C Wu
(74) *Attorney, Agent, or Firm* — Invoke

(57) ABSTRACT

Techniques for filtering telemetry data to allocate system resources among system components are disclosed. A system filters a data set of telemetry data prior to allocating or re-allocating system resources to system components. A filtered data set includes data points that include the highest resource-utilization values for the system components. The system compares resource-usage for each component managed by a computing machine in one time period to the resource-usage for the component in another time period. The system omits from a filtered data set any time period in which the resource-usage value for each system component is subsumed by the resource-usage values of the same system components in another time period. The system generates resource-reallocation candidate models for the computing machines in the system based on the filtered data set. The system reallocates system resources among system components using a selected resource-reallocation candidate.

20 Claims, 11 Drawing Sheets

(56) References Cited

U.S. PATENT DOCUMENTS

| | | | |
|---|---|---|---|
| 2010/0161373 A1 | 6/2010 | Connors et al. | |
| 2012/0311597 A1 | 12/2012 | Manula et al. | |
| 2013/0014107 A1* | 1/2013 | Kirchhofer | G06F 9/5083 |
| | | | 718/1 |
| 2013/0103640 A1* | 4/2013 | Rehman | G06Q 30/0232 |
| | | | 707/736 |
| 2013/0111033 A1 | 5/2013 | Mao et al. | |
| 2014/0007097 A1 | 1/2014 | Chin et al. | |
| 2014/0172929 A1 | 6/2014 | Sedayao et al. | |
| 2015/0312169 A1 | 10/2015 | Klots et al. | |
| 2016/0156567 A1 | 6/2016 | Miyahara et al. | |
| 2016/0283271 A1* | 9/2016 | Ashby, Jr. | G06F 9/5072 |
| 2016/0306678 A1 | 10/2016 | Hira et al. | |
| 2016/0323169 A1* | 11/2016 | Song | G06F 11/3466 |
| 2017/0195410 A1 | 7/2017 | Sebbah et al. | |
| 2017/0220364 A1 | 8/2017 | Kadioglu et al. | |
| 2018/0024860 A1* | 1/2018 | Balle | G06F 9/4881 |
| 2018/0074855 A1* | 3/2018 | Kambatla | G06F 9/4881 |
| 2018/0173605 A1 | 6/2018 | Kadioglu et al. | |
| 2018/0357342 A1* | 12/2018 | Iwai | H04N 1/00204 |
| 2019/0095245 A1 | 3/2019 | Abes et al. | |
| 2019/0327185 A1* | 10/2019 | Hassan | H04L 43/0876 |
| 2020/0034201 A1 | 1/2020 | Lu et al. | |
| 2020/0074412 A1 | 3/2020 | Colena | |
| 2020/0341597 A1* | 10/2020 | Cannata | G06F 9/451 |
| 2020/0344329 A1* | 10/2020 | Cannata | G06F 3/0661 |
| 2021/0026430 A1* | 1/2021 | Nakamura | G06F 1/324 |
| 2021/0287112 A1* | 9/2021 | Ramasamy | G06N 5/02 |
| 2023/0043579 A1* | 2/2023 | Chitalwala | G06F 9/5038 |
| 2023/0205595 A1* | 6/2023 | Singh | G06F 11/3409 |
| | | | 718/104 |

OTHER PUBLICATIONS

F. Rossi, P. van Beek, and T. Walsh, "Handbook of Constraint Programming," Elsevier, 2006, pp. 969.

G. Pesant and M. Gendreau, "A Constraint Programming Framework for Local Search Methods," Journal of Heuristics, vol. 5, 1999, pp. 255-279.

H.N. Van et al, "Autonomic Virtual Resource Management for Service Hosting Platforms," In: ICSE Workshop on Software Engineering Challenges of Cloud Computing, 2009, pp. 1-8.

M. Garcia de la Banda, P.J. Stuckey, P.V. Hentenryck, M. Wallace, "The Future of Optimization Technology," Constraints, vol. 19, Issue 2, 2014, pp. 1-12.

M. Leconte, "A bounds-based reduction scheme for constraints of difference," In Proceedings of the Second International Workshop on Constraint-based Reasoning, 1996, pp. 19-28.

M. Trick, "A Dynamic Programming Approach for Consistency and Propagation for Knapsack Constraints," Annals of Operations Research, vol. 118, 2003, pp. 73-84.

R. Bartak, "Constraint Propagation and Backtracking-based Search," Summer school on CP, 2005. pp. 1-42.

S Heinz and J.C. Beck, "Solving Resource Allocation/Scheduling Problems with Constraint Integer Programming," 2011, pp. 1-10.

Shaw P, "A Constraint for Bin Packing," In: Wallace M. (eds) Principles and Practice of Constraint Programming—CP 2004. CP 2004, Lecture Notes in Computer Science, vol. 3258, Springer, Berlin, Heidelberg, 2004, pp. 648-662.

W Lin, et al, "A Threshold-based Dynamic Resource Allocation Scheme for Cloud Computing," Procedia Engineering, vol. 23, 2011, pp. 695-703.

* cited by examiner

TELEMETRY DATA FILTER FOR ALLOCATING STORAGE RESOURCES

TECHNICAL FIELD

The present disclosure relates to a telemetry data filter. In particular, the present disclosure relates to filtering sets of data for allocating resources within a system by identifying and omitting subsets of data subsumed by other subsets of data.

BACKGROUND

With the advancements in artificial intelligence (AI) and applications that consume more and more computing resources, computing systems require more intelligent ways of tuning the performance of their hardware. This is not a trivial problem, since applications that run on the hardware are constantly changing their load requirements. Typically, a configuration of system resources that works well at one point in time will stop working well when conditions change. As a result, operators must periodically tweak resource configurations.

Currently, systems record telemetry data as applications run. The system identifies resource usage patterns based on the telemetry data. As the demands for system resources from the applications change, the telemetry data can be used to determine better configuration settings and the system can adapt to new conditions. However, it is difficult to make intelligent decisions based on system telemetry data. The amount of available data can overwhelm attempts at analysis. As an example, one application may record "average CPU usage" every five seconds. The system may review usage information to determine whether a resource reconfiguration is required once per month. As a result, a single database in the system may generate 518,400 data snapshots per month. Further, a system typically includes multiple databases and other components, multiplying the data points and the resulting complexity of the system analysis.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
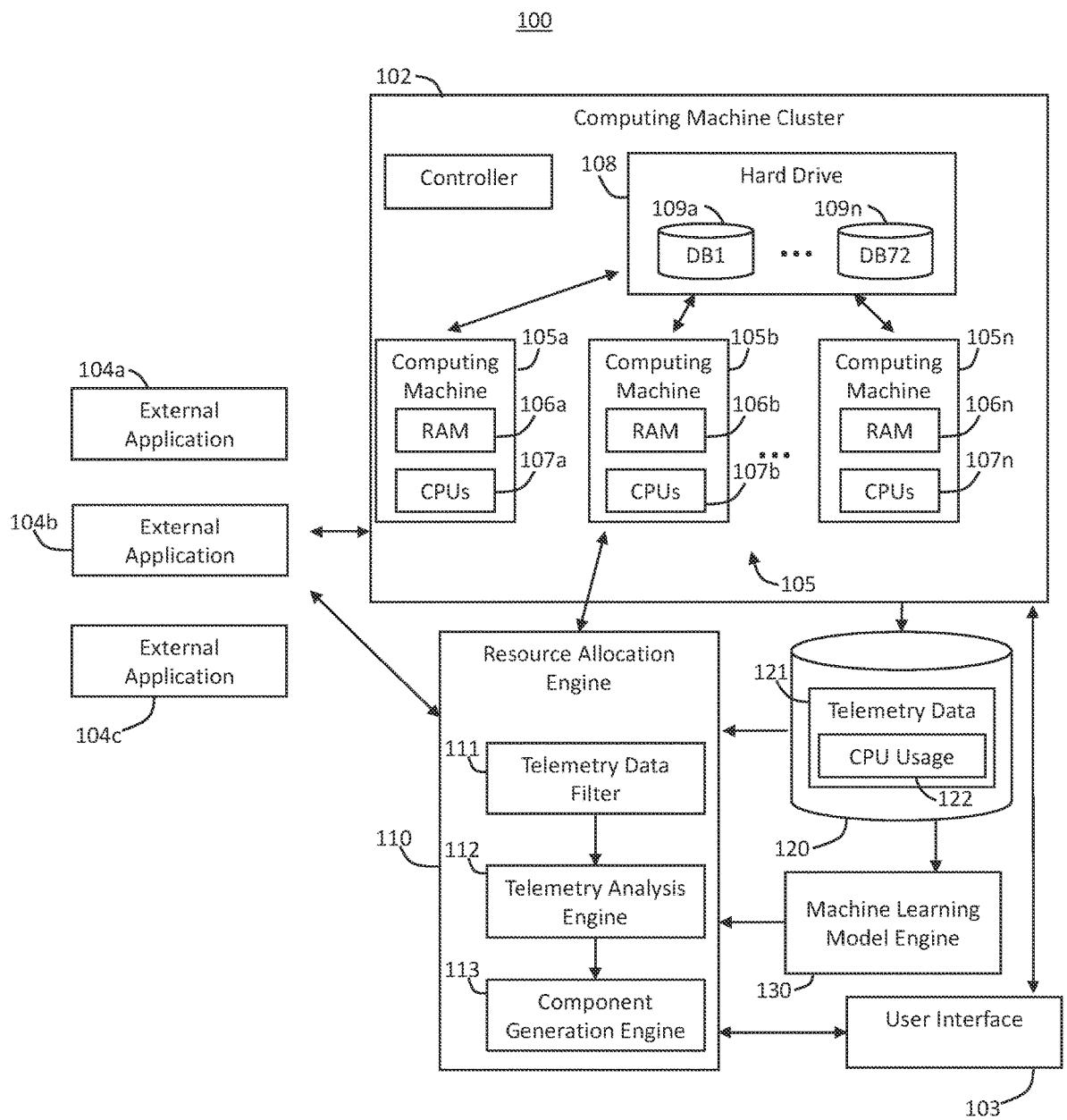
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING FILTERED DATA SET TO ALLOCATE SYSTEM RESOURCES TO SYSTEM COMPONENTS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A computing cluster includes multiple different machines having separate central processing units (CPUs) and random access memory (RAM) that share a hard drive. Computing components, such as databases, reside in the hard drive. Different machines are allocated to managing access to different components. A system monitors resource utilization, such as CPU utilization of the machines, to allocate system resources to management of the system components.

In one or more embodiments, the system applies a filter to a data set of telemetry data prior to allocating or re-allocating system resources to system components. The filter generates a filtered data set for allocating/re-allocating the resources. The filtered data set excludes some data points from the initial data set. Specifically, the system excludes data points for which resource utilization values for each system component in a time period is subsumed by each resource utilization value for the same system components in another time period. The filtered data set includes data points that include the resource-utilization values for the system components.

The system detects a resource-reallocation triggering event. The triggering event may include a user request to analyze resource allocation, a request from an application to create a component and to allocate resources to the component, a regularly-scheduled analysis of resource allocation, or a signal from a monitoring machine-learning model that resource re-allocation may be required to avoid performance degradation.

Responsive to the reallocation-triggering event, the system obtains telemetry data specifying resource usage of multiple components of a component cluster at multiple different intervals of time. For example, a regularly-scheduled re-allocation review may be scheduled monthly. Accordingly, the system may obtain telemetry data including 518,400 data snapshots, each data snapshot corresponding to a five-second time increment and including CPU core usage data for all the databases managed by a system. The system filters a data set including the data snapshots from each computing machine in the system, to omit data points associated with time periods associated with a set of resource utilization values that are subsumed by resource utilization values of other time periods. The system filters the data set by comparing the resource-usage for each component managed by the computing machines in one time period to the resource-usage for each component managed by the machines in each other time period. The system generates a filtered data set by omitting from the data set data points for any time period in which the resource usage for each component is less than or equal to the resource usage for the same respective component in another time period.

In one embodiment, the system generates a single filtered data set for a plurality of computing machines managing system components. In addition, or in the alternative, the system may generate multiple filtered data sets by generating a separate filtered data set for each computing machine in the system. The system compares the resource-usage for each component managed by a selected computing machine in one time period to the resource-usage for each component managed by the selected computing machine in each other time period. The system generates a filtered data set for the selected computing machine by omitting from the data set data points for any time period in which the resource usage for each component is less than or equal to the resource usage for the same respective component in another time period.

The filter may be implemented as source code executed by a computer. The computer may receive the unfiltered data set as an input. The computer separates the unfiltered data into the resource-usage data for separate computing machines. The system further separates the data for each separate computing machine into data points for each separate time period in which data was collected. For each data set, the system performs the sequential comparison of resource usage of system components for each time period to each other time period. The computer generates a filtered set of data including data points in which the resource usage by components of computing machines was higher than in other data points. The filtered data set represents "worst-case" or highest-resource-utilization time periods.

In one embodiment, the system sorts the data set prior to filtering the data set. Sorting the data set may include calculating, for each separate time period of each separate computing machine, a sum of all the resource usage for the time period. For example, if a machine managing three databases includes values representing resource-usage of "5," "3", and "3," respectively, the sum of all the resource usage for the time period is "11." The system then sorts, for each separate computing machine, the time periods in order from highest total resource usage to lowest total resource usage. By sorting the time periods according to total resource-usage, the system may then filter the data set by performing a unidirectional comparison between two time periods, rather than a bi-direction comparison. For example, without sorting, the system determines whether each resource-usage value in time period A is greater than each resource-usage value in time period B. The system must also determine whether each resource-usage value in time period B is greater than each resource-usage value in time period A corresponding to the same system components. In contrast, when pre-sorting is performed in which the sum of resource-usage in time period A is greater than the sum of resource-usage in time period B, the system may perform a filtering comparison with a single comparison to determine whether each resource-usage value in time period A is greater than each resource-usage value in time period B. The system need not perform a filtering comparison to determine whether each resource-usage value in time period B is greater than each resource-usage value in time period A corresponding to the same system components.

The system generates candidates for allocating resources to a new component, and/or re-allocating resources among existing components, using the filtered data set. For example, the system may identify a high-resource-utilizing component in one machine and generate candidate models for re-allocating resources among the components by assigning the component to another computing machine. The system generates the candidate models using the filtered data points for the other machines. Alternatively, the system may generate candidates for allocating a new component in each existing machine, using the filtered data points for each existing machine. The system may reallocate existing components among resources when allocating a new component to an existing machine. The system may analyze the candidate models to determine which candidate meets predetermined performance criteria. For example, the system may reassign an existing component from an existing machine to another existing machine. The system reallocates the resources of the machines accordingly. When the system reassigns the component to the other existing machine, the system may generate a candidate model for the performance of the existing machine, including the newly-assigned component, using the measured resource-utilization values from the filtered data set for the existing component as a predictive indicator for the performance of the candidate model. For example, the filtered data set may include two time periods, filtered down from one hundred time periods. If the resource-usage of the component in the first time period is "1" and the resource usage of the component in the second time period is "7," the system may generate the candidate model for reassigning the component to the new machine by applying a resource-usage values of "1" and "7" to the predicted performance of the new, at the respective time periods.

The system selects a candidate model, for allocating resources among components, in which each machine is predicted to perform within predetermined thresholds. For example, the system may calculate, for each resource reallocation model, a sum of maximum resource usage for each time period in the filtered data set. The system may select the candidate model for which the sum of maximum resource usage is the lowest among the most or all machines across most or all time periods in the filtered set. In one embodiment, a machine learning model is applied to the resource-allocation models to recommend one or more candidates for resource-allocation. For example, the machine learning model may be trained on a data set of telemetry data to identify relationships among resource usage of different components. The machine learning model may generate a recommendation that accounts for a likelihood that a particular resource-utilization scenario will occur. For example, the machine learning model may identify a correlation among two components that the components do not have peak resource-usage at the same time. Accordingly, the machine learning model may recommend a particular resource allocation configuration that has a potentially-higher resource-usage sum than another configuration, based on determining that the configuration having the potentially-higher resource-usage sum is not likely to occur.

In one or more embodiments, the system stores metadata associated with filtering the data set to select a candidate model for allocating/reallocating resources among components. For example, the system may store the number of time periods subsumed by each time period in the filtered data set. When determining which candidate resource allocation/reallocation model to select, the system may apply a greater weight to time a time period that subsumed a greater number of time periods relative to another time period. For example, if a time period of one machine subsumed 10 time periods in the filtering process, and if a time period of another machine subsumed 5 time periods, the system may give greater weight to a candidate in which a component is reassigned to the former machine instead of the latter machine.

The system initiations the allocation of resources to a new component and/or reallocation of resources among one or more existing components. Initiating the reallocation may include providing to a user, via a user interface, a set of options for resource allocation/reallocation. Alternatively, the system may initiate resource allocation/reallocation without user input.

The amount of performance data generated based on monitoring a data center including multiple clusters of computing machines, each computing machine including tens of computing cores, and each computing machine assigned to manage multiple databases, with resource-usage values measured in increments of seconds, is incapable of being processed by a human. In addition, even for a machine, processing the large amount of telemetry data generated by a data center may result in reduced performance of a system during the processing. Accordingly, one or more embodiments filter the telemetry data for a system including computing machine clusters prior to reallocating resources among system components. The process of filtering the telemetry data compares like elements of two data points with each other, without comparing one element of a data point to a different element of another data point. If one element is a first database and another element is a second database, the resource usage of the first database may not be compared with the resource usage of the second database. The measurements of the resulting filtered sets of data for multiple computing machines are used to predict the performance of the computing machines when resources are reallocated among system components.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a computing machine cluster 102, a user interface 103, external applications 104a, 104b, and 104c, a resource allocation engine 110, a data repository 120, and a machine learning model engine 130. In one or more embodiments, the data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the computing machine cluster 102 or the resource allocation engine 110. Alternatively, or additionally, a data repository 104 may be implemented or executed on a computing system separate from the computing machine cluster 102 or the resource allocation engine 110. A data repository 104 may be communicatively coupled to the computing machine cluster 102 or the resource allocation engine 110 via a direct connection or via a network.

Information describing telemetry data 121 may be implemented across any of components within the system 100. However, this information is illustrated within the data repository 120 for purposes of clarity and explanation.

The computing machine cluster 102 includes computing machines 105a, 105b, to 105n. The number of computing machines is not limited to three, but may include any number of computing machines. Each computing machine 105 includes one or more central processing units (CPUs) 107a-107n and a set amount of random access memory (RAM) 106a-106n. Each CPU may include one or more processing cores. For example, a single CPU may include 4 processing cores. Computing machine 105a may have 4 CPUs 107a for a total of 16 processing cores. The CPUs 107a-107n, processing cores, or RAM 106a-106n may be referred to as "resources." Resources are computing entities, such as physical and virtual devices and communication channels, that facilitate the execution of operations associated with computing components. For example, in FIG. 1, when a database 109a is assigned to computing machine 105a, the resources (CPUs 107a and RAM 106a) process queries to the database 109a, generate responses to the queries, and process modifications to a content of the database 109a.

The computing machine cluster 102 includes a hard drive 108. The hard drive stores databases DB1-DB72 109a-109n. The databases are computing components. Each database is assigned to at least one of the computing machines 105. The computing machine that hosts a database manages any incoming requests to access the database and responds to queries for obtaining data from the database. While FIG. 1 illustrates databases 109a-109n as computing components, embodiments of computing components include data objects and applications. The computing machines 105a-105n share the same hard drive 108. However, each computing machine 105a-105n has its own CPUS 107a-107n and RAM 106a-106n.

In one embodiment, the CPUs of each computing machine 105a-105n are allocated among the databases assigned to the computing machine 105a-105n. For example, three databases 109a, 109b, and 109c may assigned to computing machine 105a. Further, computing machine 105a may include eight CPUs 107a. Two CPUs 107a may be allocated to database 109a, two CPUs 107a may be allocated to database 109b, three CPUs 107a maybe allocated to database 109c, and one CPU 107a may be unallocated to any database.

The resource allocation engine 110 controls the assignment of the databases 109a-109n to the computing machines 105a-105n and the allocation/reallocation of resources to the databases 109a-109n. The computing machine cluster 102 provides telemetry data 121 to a data repository 120. The telemetry data 121 includes data representing the resources used by the databases 109a-109n. For example, the telemetry data 121 may include measurements of CPU usage 122 taken every five seconds, where each CPU is allocated to a particular database 109a-109n. Accordingly, the telemetry data 121 represents the CPU usage for each database 109a-109n over time.

The telemetry data filter 111 filters the telemetry data 121 to generate a filtered data set. The resource allocation engine 110 may initiate the filtering of the telemetry data 121 based on a user request, at predetermined time intervals, or based on detecting an anomaly in the computing machine cluster. For example, an external application 104a, 104b, or 104c may initiate a request to create a new database and allocate resources to the database. The resource allocation engine 110 initiates data filtering as a first step in assigning the new database to a computing machine 105a-105n and allocating resources of the computing machine 105a-105n to the new database.

In one embodiment, when an external application 104a-104c requests creation of a database, the component generation engine 113 applies predefined rules to generate a database having a particular characteristics, including data storage size and data objects stored. The resource allocation engine 110 determines which computing machines 105 are assigned to the new database. The resource allocation engine 110 may assign one computing machine 105 to the new database or multiple computing machines 105 to the database. The resource allocation engine 110 may further allocate a particular number of CPUs 107a-107n from the assigned computing machines 105 to the new database. For example, the resource allocation engine 110 may allocate three CPUs 107a from computing machine 105a to the new database and four CPUs 107b from the computing machine 105b to the new database.

In one embodiment, the resource allocation engine 110 initiates filtering of the telemetry data 111 and resource reallocation based on receiving a notification from a machine learning model engine 130 monitoring the telemetry data 121. The machine learning model engine 130 may monitor the telemetry data 121 to detect anomalies in the telemetry data 121. For example, the machine learning model engine 130 may train a machine learning model using a training set of telemetry data to identify correlations among resource usage of system components and system anomalies, such as insufficient resources available to handle resource usage requests. The machine learning model engine 130 may apply the telemetry data 121 to the trained machine learning model to identify anomalies or potential anomalies in the telemetry data 121. When the trained machine learning model detects an anomaly, such as a combination of resource usage by the databases 109a-109n that is likely to result in performance degradation, the machine learning model engine 130 may transmit a notification to the resource allocation engine 110 to reallocate system resources among the system components. In particular, the machine learning model engine 130 may recommend that the resource allocation engine 110 to reallocate CPUs 107a-107n among the databases 109a-109n. In one embodiment, the machine learning model engine 130 trains a neural net-type machine learning model. In an alternative embodiment, the machine learning model engine 130 trains a deterministic-type machine learning model.

The telemetry data filter 111 generates the filtered data set by omitting from the data set the data points for any time period in which the resource usage for each component of a computing machine is less than or equal to the resource usage for the same respective components in another time period. A data point for a time period in which the resource usage for each component of a computing machine is less than or equal to the resource usage for the respective components in another time period is referred to as being "subsumed" by the other time period. Referring to FIG. 1, the telemetry data filter 111 analyzes one or more data sets for one or more of the computing machines 105. The telemetry data filter 111 determines, for each data point specifying CPU usage by the databases 109a-109n, whether the data point for one time period is subsumed by any other data point for any other time period.

In one embodiment, the telemetry data filter 111 performs the filtering individually for each respective machine 105. For example, if a request is received to reallocate CPUs 107a among the databases assigned to the machine 105a, the telemetry data filter 111 may perform filtering on data associated with the machine 105a without comparing the data to the data from the machines 105b-105n. The telemetry data filter 111 divides the telemetry data 121 into separate data sets for each computing machine 105a-105n. The telemetry data filter 111 analyzes the data set for the computing machine 105a to determine, for each data point specifying CPU 107a usage by databases 109a-109n managed by the computing machine 105a, whether a data point for one time period subsumes any other data points for any other time periods. If so, the telemetry data filter 111 omits the subsumed data points from the filtered set of telemetry data. The telemetry data filter 111 may repeat the analysis for the data points associated with each computing machine 105a-105n.

In another embodiment, the telemetry data filter 111 performs the filtering on a data set comprising data points associated with all of the machines 105a-105n. For example, a user interface 103 may generate a request to reallocate all the CPUs 107a-107n among all the databases 109a-109n. Alternatively, the request may be to reallocate a subset of the CPUs 107a-107n. For example, the request may be to reallocate the CPUs of three computing machines among the databases managed by the three computing machines. In one example, one database 109a may be redundantly assigned to two computing machines 105a and 105b. At one snapshot, the database 109a is using 2 cores from machine 105a and 12 cores from machine 105b. Accordingly, the telemetry data filter 111 provides the snapshot for all of the machines 105, including information indicating the database 109a uses 14 total cores from two computing machines 105a and 105b at a specific period of time, to the telemetry analysis engine 112.

In one embodiment, the telemetry data filter sorts the telemetry data 121 prior to filtering the telemetry data 121. The telemetry data filter 111 may calculate, for each data point associated with a separate time period of each separate computing machine, a sum of all the resource usage for the time period. For example, if the computing machine 105a hosts three databases 109a-109c, and if values representing resource-usage of the three databases for data point are "5," "3", and "3," respectively, the sum of all the resource usage for the time period is "11." The telemetry data filter 111 sorts, for each separate computing machine 105a-105n, the data points for all of the time periods associated with each computing machine 105a-105n in order from highest total resource usage to lowest total resource usage.

In an alternative embodiment, the telemetry data filter 111 sorts data points including resource-usage data of the entire computing cluster. For example, one data point may include the resource-usage of each computing machine 105a-105n.

Upon sorting the telemetry data, the telemetry data filter 111 generates the filtered data set by first comparing the data point having the highest-total resource usage to the data point having the next-highest-total resource usage. The telemetry data filter 111 sequentially compares the data point having the highest-total resource usage to each subsequent data point, eliminating from the data set any subsumed data points. By sorting the time periods according to highest-total resource-usage, the system may then filter the data set by performing a unidirectional comparison between two time periods, rather than a bi-direction comparison. For example, without sorting, the system determines whether each resource-usage value in time period A is greater than each resource-usage value in time period B. The system must also determine whether each resource-usage value in time period B is greater than each resource-usage value in time period A corresponding to the same system components. In contrast, by sorting the data points, the telemetry data filter 111 may perform a filtering comparison with a single comparison to determine whether each resource-usage value in time period A, having a higher total resource usage value is greater than each resource-usage value in time period B corresponding to the same system components. The system need not perform a filtering comparison to determine whether each resource-usage value in time period B is greater than each resource-usage value in time period A corresponding to the same system components. Upon completing the comparison of the first data point with each other data point, the telemetry data filter 111 next compares the data point having the next-highest-total resource usage, that was not subsumed by the first data point, with each other data point, in order from highest-total resource usage to lowest-total resource usage. Accordingly, the telemetry data filter 111 iteratively filters the data set by comparing each data point with each other data point having a lower-total resource usage.

The telemetry analysis engine 112 analyzes the filtered data set of telemetry data generated by the telemetry data filter 111 to generate candidates for allocating or reallocating the CPUs 107a-107n among the databases 109a-109n. For example, if an external application 104a requests creation of a new database, the telemetry analysis engine 112 may (a) predict a resource-usage value for the new database, and (b) apply the value for the resource-usage for the new database to each data point of the filtered data set generated by the telemetry data filter 111 to identify predicted resource usage values for each of the data points. Based on the predicted resource usage values for each of the data points, the telemetry analysis engine 112 may model the predicted resource utilization for each computing machine 105a-105n. In addition, the telemetry analysis engine 112 may model potential resource-usage values based on reassigning one or more databases to different computing machines 105a-105n.

For example, the telemetry analysis engine 112 may identify a high-resource-utilizing database 109a allocated to one computing machine 105a and generate candidate models for re-assigning the database 109a to each other computing machine 105b-105n, using the filtered data points for the other computing machines 105b-105n. The telemetry analysis engine 112 may generate candidate models for reallocating the resources of the computing machines 105a-105n to existing databases 109a-109n either (a) based on the resource allocation engine 110 receiving a request to generate a new database, or (b) based on a reallocation of resources among existing databases independent of the generation of any new database.

The telemetry analysis engine 112 analyzes the candidates for allocating/reallocating the resources, such as the CPUs 107a-107n and/or RAM 106a-106n, among the databases 109a-109n to determine which candidate meets predetermined performance criteria. For example, if three CPUs 107a of the computing machine 105a are initially allocated to the database 109a, the telemetry analysis engine 112 may (a) de-allocate one or more of the three CPUs 107a from the database 109a, and (b) allocate the same number of CPUs 107b of the computing machine 105b to the database 109a. When the telemetry analysis engine 112 reassigns the database 109a to the computing machine 105b, the telemetry analysis engine 112 generates a candidate model for the performance of the computing machine 105b using the measured CPU-utilization value for the database 109a from the computing machine 105a in the same time period to predict the CPU-utilization value for the machine 105b.

According to one example, the filtered data set may include two data points associated with the computing machines 105a and 105b, filtered down from one hundred data points. If the CPU-usage of the database 109a in the first data point, associated with a first time period, is "1," and the CPU-usage of the database 109a in the second data point, associated with a second time period, is "7," the telemetry analysis engine 112 may generate the candidate model for reallocating the CPUs 107b to the database 109a by applying a CPU-usage value of "1" to the predicted performance of the computing machine 105b in the first time period and applying the CPU-usage value of "7" to the predicted performance of the computing machine 105b in the second time period.

The resource allocation engine 110 selects a candidate allocation model for allocating CPUs 107a-107n among databases 109a-109n. The resource allocation engine 110 may select the candidate allocation model based on determining that each computing machine 105a-105n is predicted to perform within predetermined thresholds. For example, the resource allocation engine 110 may calculate, for each candidate resource reallocation model, a sum of maximum CPU usage for each time period in the filtered data set for each computing machine 105a-105n. The resource allocation engine 110 may select the candidate allocation model for which (a) the sum of maximum CPU usage is the lowest among the most computing machines 105a-105n, and (b) the sum of maximum CPU usage for each data point in the filtered data sets for computing machine 105a-105n is below a threshold value.

In one embodiment, the resource allocation engine applies a machine learning model to the resource-allocation models to recommend one or more candidate resource allocation models. For example, the machine learning model may be trained on a data set of telemetry data to identify relationships among CPU usage of different databases 109a-109n. The machine learning model may generate a recommendation that accounts for a likelihood that a particular CPU-utilization scenario will occur. For example, the machine learning model may identify a correlation among two databases 109a and 109b that the databases 109a and 109b do not have peak CPU-usage at the same time. Accordingly, the machine learning model may recommend a particular candidate resource allocation model that has a potentially-higher CPU-usage sum than another candidate model, based on determining that the candidate having the potentially-higher CPU-usage sum is not likely to occur.

The resource allocation engine 110 includes a component generation engine 113 to generate an instance of a database in the hard drive 108 based on a request, such as a request from an external application 104a-104c. The resource allocation engine 110 assigns the new database to one or more of the computing machines 105a-105n and allocates CPUs 107a-107n to the new database based on the above-described process for filtering telemetry data and generating candidate resource allocation/reallocation models.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the resource allocation engine 110 refers to hardware and/or software configured to perform operations described herein for filtering telemetry data, generating candidate resource allocation/reallocation models, and selecting candidate resource allocation/reallocation models to configure a computing machine cluster 102. Examples of operations for filtering telemetry data, generating candidate resource allocation/reallocation models, and selecting candidate resource allocation/reallocation models to configure a computing machine cluster 102 are described below with reference to FIGS. 2A-B.

In an embodiment, the computing machine cluster 102 and the resource allocation engine 110 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 103 refers to hardware and/or software configured to facilitate communications between a user and the resource allocation engine 110. Interface 103 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 103 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CS S). Alternatively, interface 103 is specified in one or more other languages, such as Java, C, or C++.

Figure 2A:
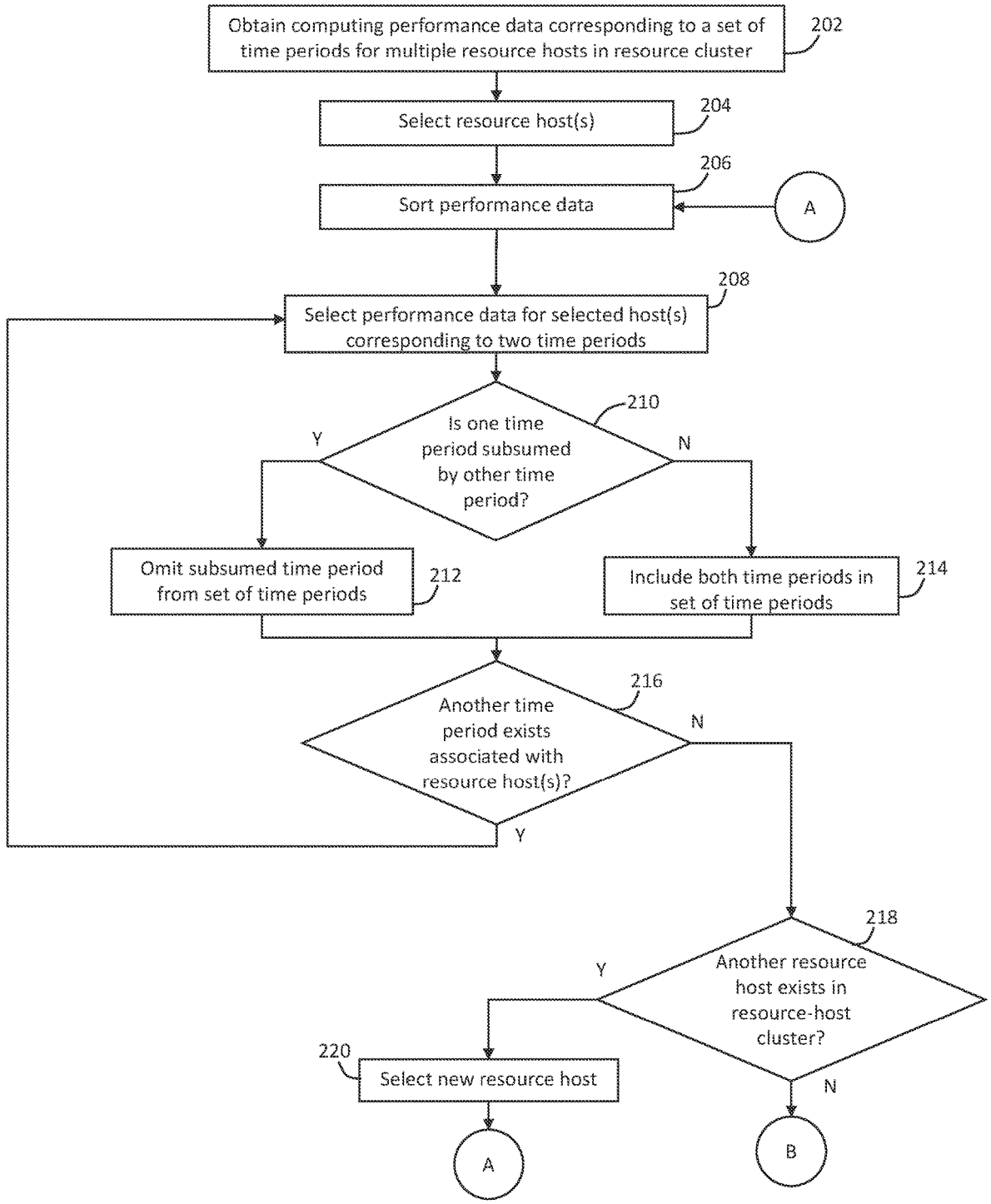
FIGS. 2A-2B illustrate an example set of operations for generating a filtered data set to allocate system resources among system components in accordance with one or more embodiments.
Figure 2B:
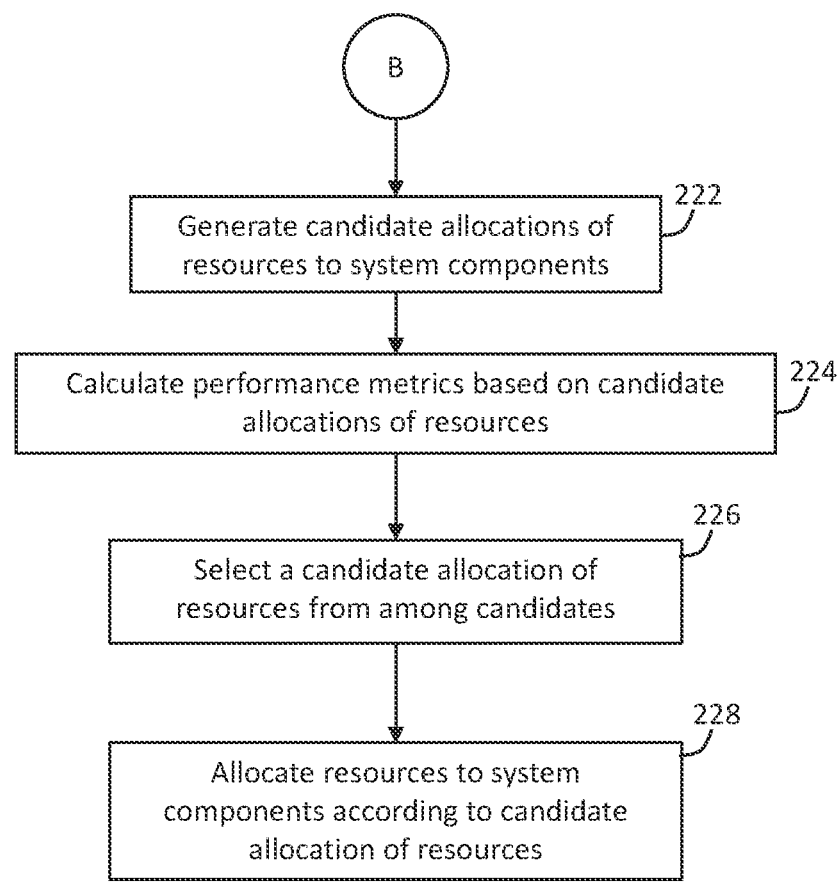

3. Generating Filtered Data Set to Allocate System Resources to System Components FIGS. 2A and 2B illustrate an example set of operations for generating a filtered data set to allocate resources to system components in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system obtains computing performance data corresponding to multiple time periods for multiple resource hosts in a resource host cluster (Operation 202). The system may include a computing cluster of computing machines that share a hard drive storage space. Each computing machine may have its own set of CPUs and RAM. System components, such as databases or applications, stored on the hard drive may be assigned to one or more computing machines. The assigned computing machine manages access to, and execution of operations associated with, the system component. In an example in which the system component is a database stored on the hard drive, the system assigns a set number of CPUs of a computing device to manage the database. Any queries directed to the database and responses generated based on the queries are executed by the assigned set number of CPUs. In one or more embodiments, the set number of CPUs may encompass a range of CPUs. For example, the system may assign a minimum number of CPUs to a database and guarantee the database will have access to the minimum number of CPUs. The system may also assign a maximum number of CPUs to the database. If a resource host includes CPUs that are not guaranteed to another database and are available for use, and if the database has not yet reached its maximum number of CPUs-utilized, the resource host may utilize one or more of the available CPUs to handle queries and responses for a particular database.

The computing performance data includes telemetry data including measured or estimated resource-usage data. For example, in the example in which the system resources include CPUs and the system components include databases, the system may track and record CPU-usage levels for each database in the system at predetermined intervals of time. The computing performance data may include thousands or millions of data points, each data point corresponding to a set of values representing resource usage of a set of system components of a particular computing machine over a particular interval of time.

The system selects one or more resource hosts for performing data filtering to reduce a size of a data set available for performing an analysis to reallocate resources in the system (Operation 204). The system identifies a subset of performance data associated with the selected resource hosts. For example, the system may identify the data points in a set of telemetry data associated with one computing machine from among multiple computing machines. Alternatively, the system may identify the data points in a set of telemetry data associated with three computing machines from among eight computing machines. According to yet another example, the system may identify the data points in a set of telemetry data associated with eight computing machines in a computing cluster of eight computing machines.

The system may initiate a process for filtering the data set based on a user-initiated request. For example, a user may interact with a user interface element of a graphical user interface to control the system to perform data filtering and resource reallocation analysis. Alternatively, the system may be programmed to initiate the data filtering and resource reallocation analysis at regular time intervals, without intervening user input. In addition, or in the alternative, the system may initiate a data filtering operation and resource reallocation analysis based on receiving a request from an application to create a new system component and assign resources to the new system component. According to another alternative, an application or machine learning model may analyze system performance telemetry data and initiate the data filtering and resource reallocation operations based on detecting an anomaly in the telemetry data. For example, the application or machine learning model may detect that one computing machine, among multiple computing machines, is operating below a specified performance level. The performance may be based on a number or type of components assigned to the computing machine or a change in performance of system resources. For example, a CPU or processing thread may become degraded, increasing the resource usage of the remaining CPUs or processing threads allocated to a particular system component. Alternatively, a database may experience resource-usage levels that exceed any previously measured resource-usage levels.

In one embodiment, the system sorts the subset of performance data (Operation 206). The system may calculate, for each data point associated with a separate time period, an aggregate resource usage value that is the sum of resource usage values for all the system components assigned to the selected resource hosts in the selected time period. For example, if a particular data point includes resource usage data from five databases hosted by three computing machines, and if values representing resource-usage of the five databases for a data point are "8," "5", "2", "7," and "3," respectively, the aggregate value of all the resource usage for the time period is "25." The system sorts the data points for the selected resource hosts in order from highest aggregate resource-usage value to lowest aggregate resource-usage value.

The system selects performance data of the selected hosts for two time periods (Operation 208). For example, if the system records resource usage every minute, and the performance data is for a month, the performance data for the selected resource host includes around 21,000 data points that include the resource usage of each system component managed by the selected resource host.

The system compares the two time periods to determine whether one time period is subsumed by the other time period (Operation 210). One time period is subsumed by another time period when a resource usage value associated with each system component in the one time period is less-than or equal-to a resource usage value for the same respective system components in the other time period. For example, if a data point includes three resource-usage values of three system components assigned to two resource hosts, and if the resource-usage values for the three system components in one time period are "5," "3", and "4"; and the resource-usage values for the same three system components in another time period are "6," "3," and "5", then the latter time period subsumes the former time period.

In an embodiment in which the system sorts the performance data (Operation 206), the system may filter the data set by performing a unidirectional comparison between two time periods, rather than a bi-direction comparison. For example, in an embodiment in which the system does not sort the performance data, the system determines whether each resource-usage value in time period A is greater than each resource-usage value in time period B. The system must also determine whether each resource-usage value in time period B is greater than each resource-usage value in time period A corresponding to the same system components. In contrast, by sorting the data points, the telemetry data filter 111 may perform a filtering comparison with a single comparison operation to determine whether each resource-usage value in time period A, which has a higher total-resource-usage value, is greater than each resource-usage value in time period B corresponding to the same system components. The system need not perform a filtering comparison to determine whether each resource-usage value in time period B is greater than each resource-usage value in time period A corresponding to the same system components. In an alternative embodiment, the system may select two unsorted data points, calculate the total resource-usage values for the two data points, and then determine with a unidirectional comparison whether the resource-usage values in the data point having the higher total-resource-usage value are each higher than the respective resource-usage values in the other data point.

If the system determines that a time period is subsumed by another time period, the system omits the subsumed time period from the set of time periods (Operation 212). For example, the system may generate a new, filtered, set of performance data that excludes the performance data for time periods that have been subsumed by other time periods.

If the system determines that neither time period is subsumed by the other, the system includes both time periods in the set of time periods (Operation 214). For example, if the system has generated a new, filtered, set of performance data that excludes the performance data for time periods that have been subsumed by other time periods, then both time periods are included in the new, filtered, set of performance data.

The system determines if another time period exists associated with the selected resource host (Operation 216). If another time period exists, the system selects performance data for two time periods, including at least one time period that has not previously been compared to the other time period. The system filters the performance data corresponding to the set of time periods by iteratively selecting two time periods and determining whether one of the time periods is subsumed by the other time period and may be omitted from the set of time periods.

In one embodiment, iteratively selecting the two time periods includes: (a) setting a first time period among a set of time periods as a primary time period, (b) comparing performance data of the primary time period to performance data of every other time period in the set of time periods, (c) generating a filtered set of performance data by omitting subsumed time periods from the filtered set of performance data, and (d) repeating (a), (b), and (c) by (1) selecting a next time period, from among the filtered set of performance data, as the primary time period (2) until every time period remaining in the filtered set of time periods has been selected as the primary time period, and (3) comparing each new primary time period with every other time period in the filtered set of performance data, other than the time periods that were previously selected as the primary time periods. For example, if an initial set of performance data includes 100 time periods, time period 1 may be compared with time periods 2-100. If 20 time periods were subsumed by time period 1, the filtered set of performance data includes performance data for the remaining 80 time periods. Next, time period 2, in the filtered set of performance data, is compared with time periods 3-80 (not with time period 1). If another 20 time periods are subsumed by time period 2, the filtered set of performance data includes 60 remaining time periods. Next, time period 3, in the filtered set of performance data, is compared with time periods 4-60 (not with time periods 1 or 2). The process is repeated until every remaining time period in the filtered set of performance data has been compared with every other time period in the filtered set of performance data.

In an embodiment in which the system sorts the performance data, selecting the performance data for the two time periods includes initially selecting the performance data for the two time periods having the two highest total-resource-usage values. The system compares the performance data for the time period having the highest total-resource-usage value sequentially to the time periods having the next-highest total-resource-usage values. The system iteratively repeats the process with the resulting filtered sets of performance data by comparing the performance data for the time period having the next-highest total-resource-usage value with each other time period in the filtered set of performance data, other than those having higher total-resource-usage values.

Based on determining that each time period in the filtered set of performance values for a selected host has been compared with each other time period (Operation 216), the system determines whether another resource host exists in the resource-host cluster (Operation 218). For example, if the system is executing a process to reallocate resources within each resource host of a resource-host cluster, and if each resource-host is a group of computing machines, each having its own CPUs and RAM, and all sharing the same hard drive, the system may determine whether the performance data for each computing machine has been filtered, or whether performance data for an additional computing machine exists to be filtered. Alternatively, if the system is executing a process to reallocate resources among all the resource hosts in a cluster, including determining whether to move resource allocations between different resource hosts, the filtered data set includes the performance data for all the resource hosts in the cluster and the process proceeds to Operation 222.

Embodiments encompass any number of filtering operations applied to data from any combination of resource hosts. For example, a filtering operation may be performed individually on each resource host to reallocate resources within the resource host. According to one alternative embodiment, the filtering operation may be performed on all the resource hosts in a group of resource hosts, such as a resource host cluster. In this embodiment, the data points associated with different time periods for the group of resource hosts include resource-usage data of each system component maintained by all of the resource hosts in the group. In another alternative embodiment, a group of resource hosts may be subdivided into multiple resource-host groups for data filtering. For example, in a system including a group of 32 resource hosts, the system may divide the resource hosts into sub-groups of 4 resource hosts each. The system may initiate eight operations to reallocate the resources among the system components managed by the respective sub-groups. Accordingly, the system may initiate eight separate data filtering operations on eight separate sets of performance data corresponding to the eight sub-groups of resource hosts.

If another resource host exists in the resource-host cluster, the system selects a next resource host for filtering performance data (Operation 220). In an embodiment in which the system is reallocating resources within respective resource hosts, and not between different of resource hosts, the system performs a separate data filtering for each resource host, such that a separate set of filtered performance data is generated for each resource host. Each separate set of filtered performance data includes performance data for a set of time periods that cannot be subsumed by any other time periods in the same set of filtered performance data.

If the system determines that performance data for each resource host in the system has been filtered (Operation 218), the system generates candidate allocations of resources among system components using the resource usage values of the filtered sets of performance data (Operation 222). For example, in an embodiment in which the system includes a cluster of computing machines, each having its own CPUs and RAM, and all sharing the same hard drive, system components may include databases or applications stored on the hard drive. Each system component may be assigned to a particular number of CPUs of particular computing machines, such that operations performed in connection with the system component are executed by the designated number of CPUs of the assigned computing machine. The system generates candidate allocations of resources among the system components by generating different permutations of allocations of CPUs to the respective components. For example, one candidate allocation allocates four CPUs from a first computing machine to a new database. Another candidate allocation allocates four CPUs from a second computing machine to the new database. Yet another candidate allocation allocates four CPUs from a third computing machine to the new database. In each of these candidate allocations, eight CPUs from the first computing machine may be allocated to an existing database. In another candidate allocation, eight CPUs from the second computing machine are allocated to the existing database, and the eight CPUs from the first computing machine are un-allocated to the existing database. Each candidate allocation may include any re-allocation of CPUs (1) between existing databases managed by the same computing machine, (2) between existing databases managed by different computing machines, and (3) to newly-created databases, according to a predefined set of rules.

For example, the pre-defined set of rules may stipulate one or more of the following: (a) candidate allocations may not allocate resources from a resource-host having the highest-aggregate-resource-usage to a new database; (b) any candidate allocation may alter the CPU allocations of X number of resource hosts, where X is greater than 1 and less than all of the resource hosts, or (c) candidate allocations may not result in any time period having performance data in which aggregate-resource-usage values exceed a pre-defined threshold.

The system calculates performance metrics based on the candidate allocations of resources (Operation 224). For example, if the system generates, based on the pre-defined set of rules, 32 candidate allocations of resources, the system calculates the performance metrics for each of the 32 candidate allocations. In an example embodiment in which the performance metrics include CPU usage, the system calculates the estimated aggregate CPU usage for each of the 32 candidate allocations.

The system selects a candidate allocation of resources for implementation from among the generated candidate allocations of resources (Operation 226). The system may select the candidate allocation of resources based on applying a set of rules, based on user input, or based on a combination of the two. For example, the system may select a candidate allocation of resources for which aggregate resource usage values for all the resource hosts has the smallest variation from a mean aggregate-resource-usage value. As another example, the system may select a candidate allocation of resources for which aggregate resource usage values for one or more selected resource hosts are within a pre-defined range of values. According to yet another example, the system generates a graphical user interface including performance information for a predefined number of candidate allocations of resources. A user may interact with the graphical user interface (GUI) to select one of the candidate allocations of resources. In addition, or in the alternative, the user may interact with the GUI to modify a candidate allocation of resources prior to selection. For example, the user may swap a pair of database assignments between two computing machines. The system may display aggregate resource usage values for each resource host in each candidate allocation of resources. The system may modify the GUI to update aggregate resource usage values for a particular candidate allocation of resources based on a user modifying the candidate allocation of resources.

The system allocates the resources to the system components according to the selection of the candidate allocation of resources (Operation 228). For example, the system may update a mapping table accessed by a resource-host cluster controller, gateway, or other traffic-management component in the resource-host cluster, to reflect the allocations of resources to system components in the selected candidate allocation of resources.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A to 3G illustrate and example embodiment in which a system filters telemetry data of a computing machine cluster to allocate CPUs among databases managed by the system.

A system obtains computing performance data corresponding to multiple time periods for multiple resource hosts in a resource host cluster. The computing performance data is stored as telemetry data 311 in a data repository 310. The system includes a computing machine cluster of computing machines that share a hard drive storage space. Accordingly, the telemetry data 311 includes data 312 associated with the computing machine cluster and subsets of data 313a-313n associated with each respective computing machine (machine 1, machine 2, . . . machine 8). Each computing machine includes its own set of CPUs and its own RAM. Additional system resources included in the computing machines may include virtual machines, data transmission (I/O) ports, and communications channels. The system manages a set of multiple databases stored on the hard drive storage space. The system assigns CPUs to respective databases to execute operations associated with the respective databases.

Figure 3A:
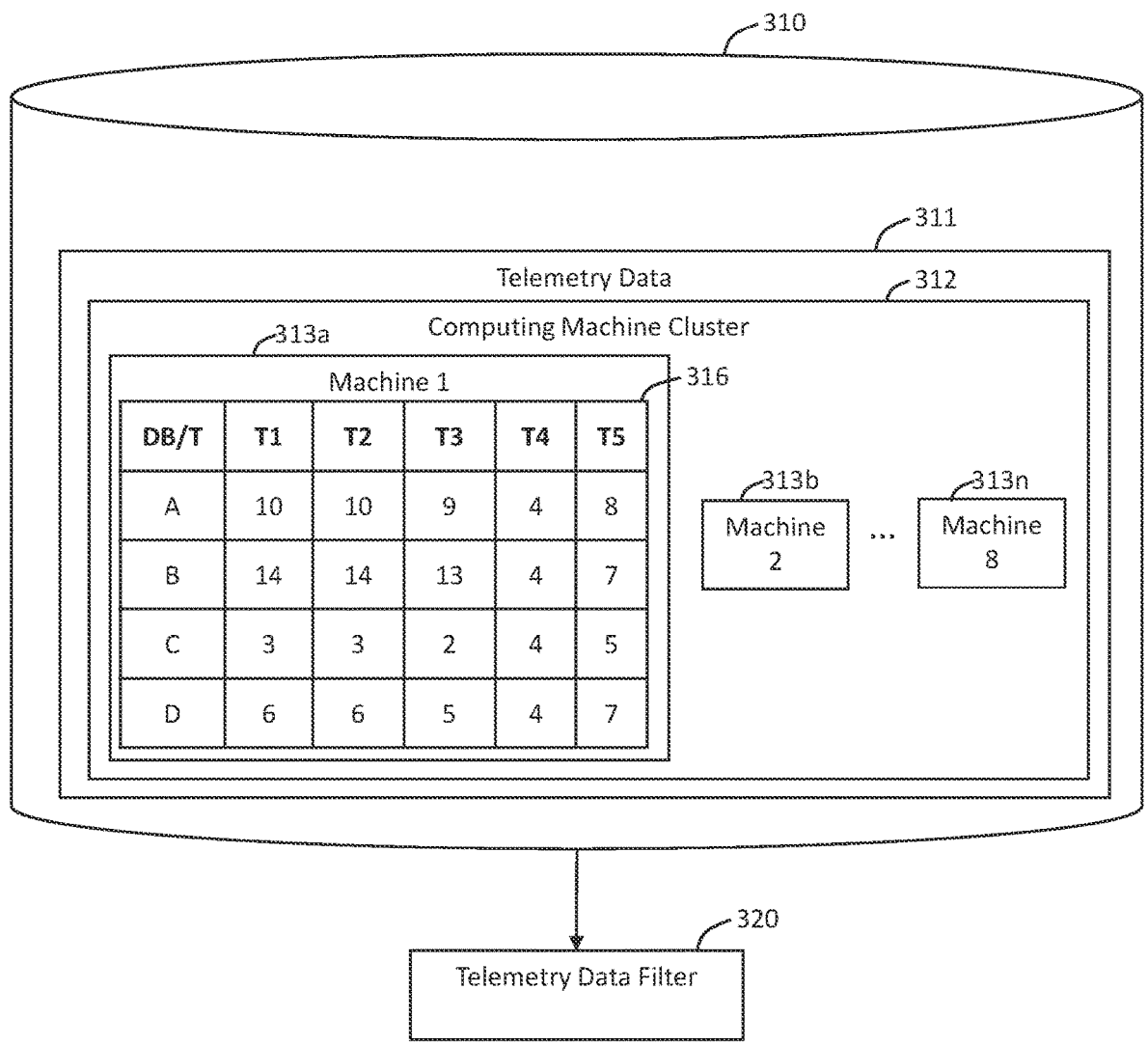
FIGS. 3A-3G illustrate an example embodiment of filtering performance data and allocating system resources among system components.

FIG. 3A illustrates the performance data 316 associated with the computing machine 1 (313a). The performance data 316 includes values representing CPU usage of each database A-D managed by the machine 1 (313a) in each time period T1-T5. The telemetry data 311 also includes the performance data (not shown in FIG. 3A) for machine 2 (313b)-machine 8 (313n).

The system further includes a telemetry data filter 320.

Figure 3B:
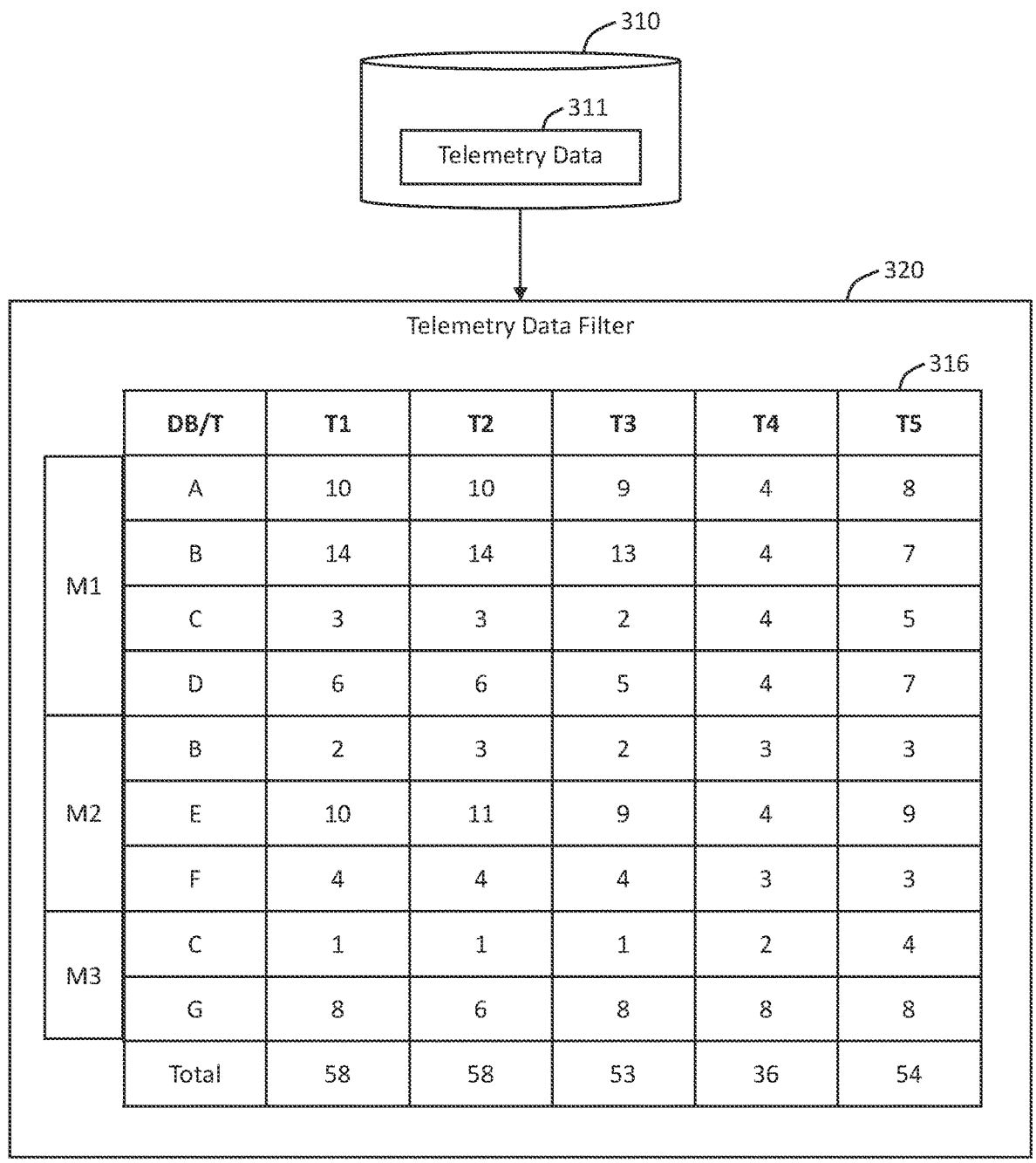

As illustrated in FIG. 3B, based on receiving an instruction to initiate reallocate CPUs among machine 1 (313a), machine 2 (313b), and machine 3 (313c), to the databases managed by machine 1, machine 2, and machine 3, respectively, the telemetry data filter 320 obtains the telemetry data 311, including the performance data 316 for the three machines, from the data repository 310. The performance data includes the performance data for databases A-D maintained by machine 1 (313a), databases B, E, and F maintained by machine 2 (313b), and databases C and G maintained by machine 3 (313c).

Figure 3C:
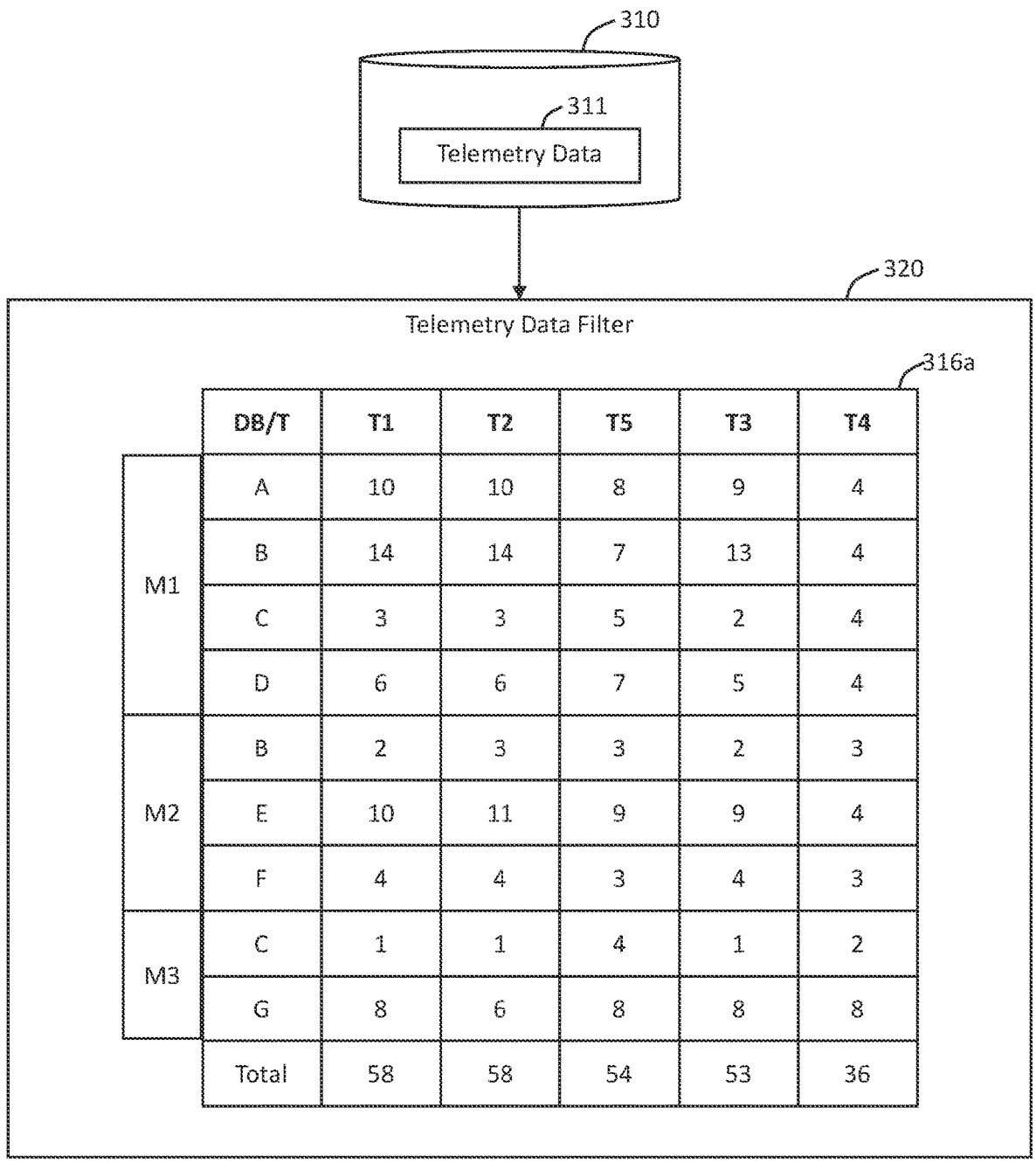

As illustrated in FIG. 3C, the telemetry data filter 320 sorts the performance data 316a. The system calculates, for each time period T1-T5, an aggregate resource usage value that is the sum of resource usage values for all the databases A-G for which performance data is included in the data set 316a. The system sorts the time periods according to their respective aggregate resource-usage value. In the example illustrated in FIG. 3C, the system sorts the time periods, left-to-right, in order from highest aggregate-usage value to lowest aggregate-usage value. The sorting results in the time period T5 being moved between time periods T2 and T3.

Figure 3D:
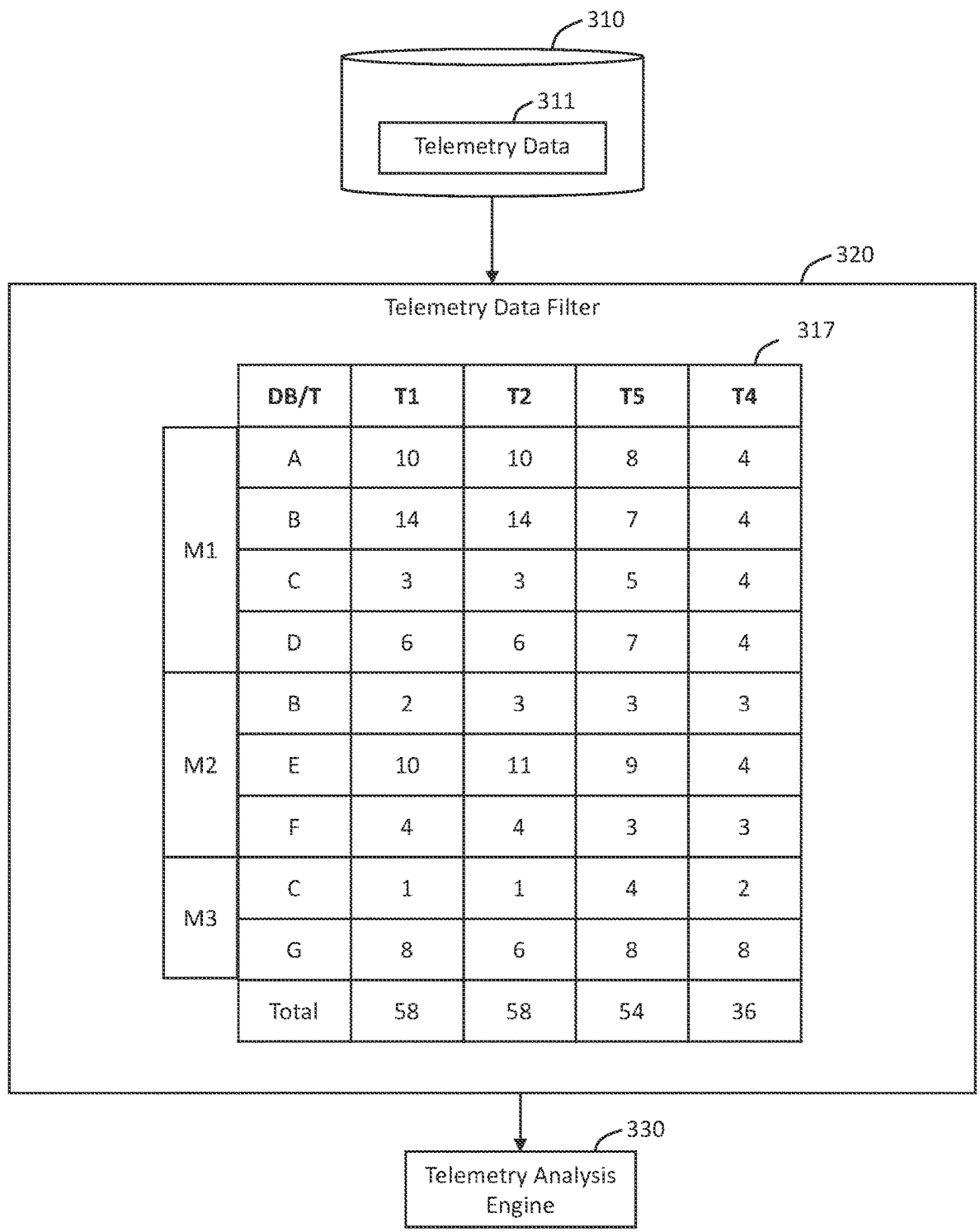

As illustrated in FIG. 3D, the telemetry data filter 320 filters the data set 317 by sequentially comparing the time period T1, having the highest aggregate usage value, with each of the time periods T2, T3, T5, and T4. The telemetry data filter 320 determines that the usage values for time period T1 (values: 10, 14, 3, 6, 2, 10, 4, 1, 8) are equal-to or greater than the usage values for the same respective databases of time period T3 (values: 9, 13, 2, 5, 2, 9, 4, 1, 8). Specifically, 10>10, 14>13, 3>2, 6>5, 2=2, 10>9, 4=4, 1=1, 8=8. Accordingly, the telemetry data filter 320 omits time period T3 from the filtered set of performance data 317.

Figure 3E:
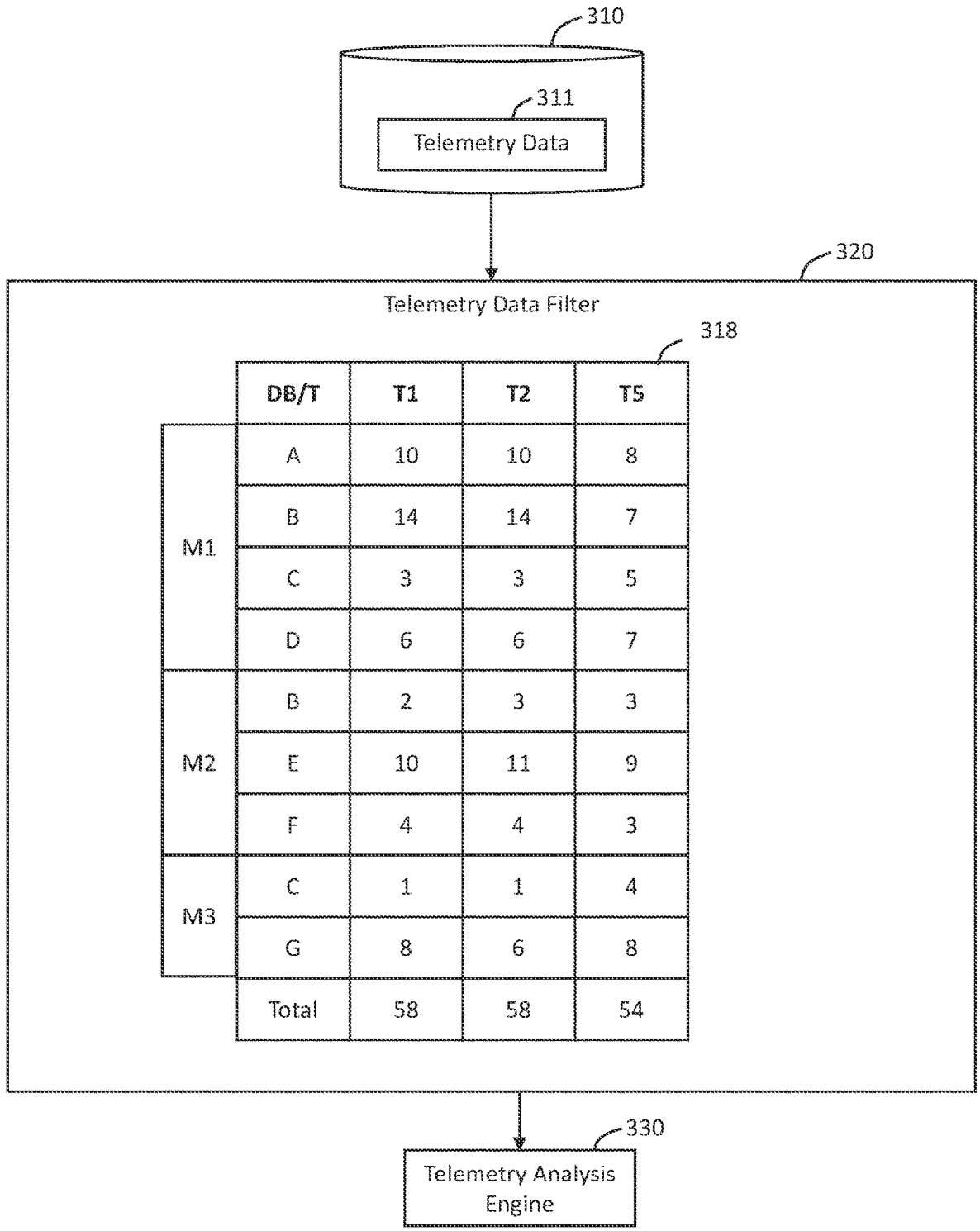

As illustrated in FIG. 3E, the system iteratively filters the performance data by, after comparing time period T2 with time periods T5 and T4, and comparing time period T5 with time period T4. The telemetry data filter 320 determines that the usage values for time period T5 are equal-to or greater than the usage values for the same respective databases of time period T4. Accordingly, the telemetry data filter 320 determines that the time period T5 subsumes the time period T4 and omits time period T4 from the filtered set of performance data 318.

While five time periods are illustrated in the performance data 316 for purposes of clarity in illustration, embodiments encompass hundreds, thousands, and even millions of time periods.

Figure 3F:
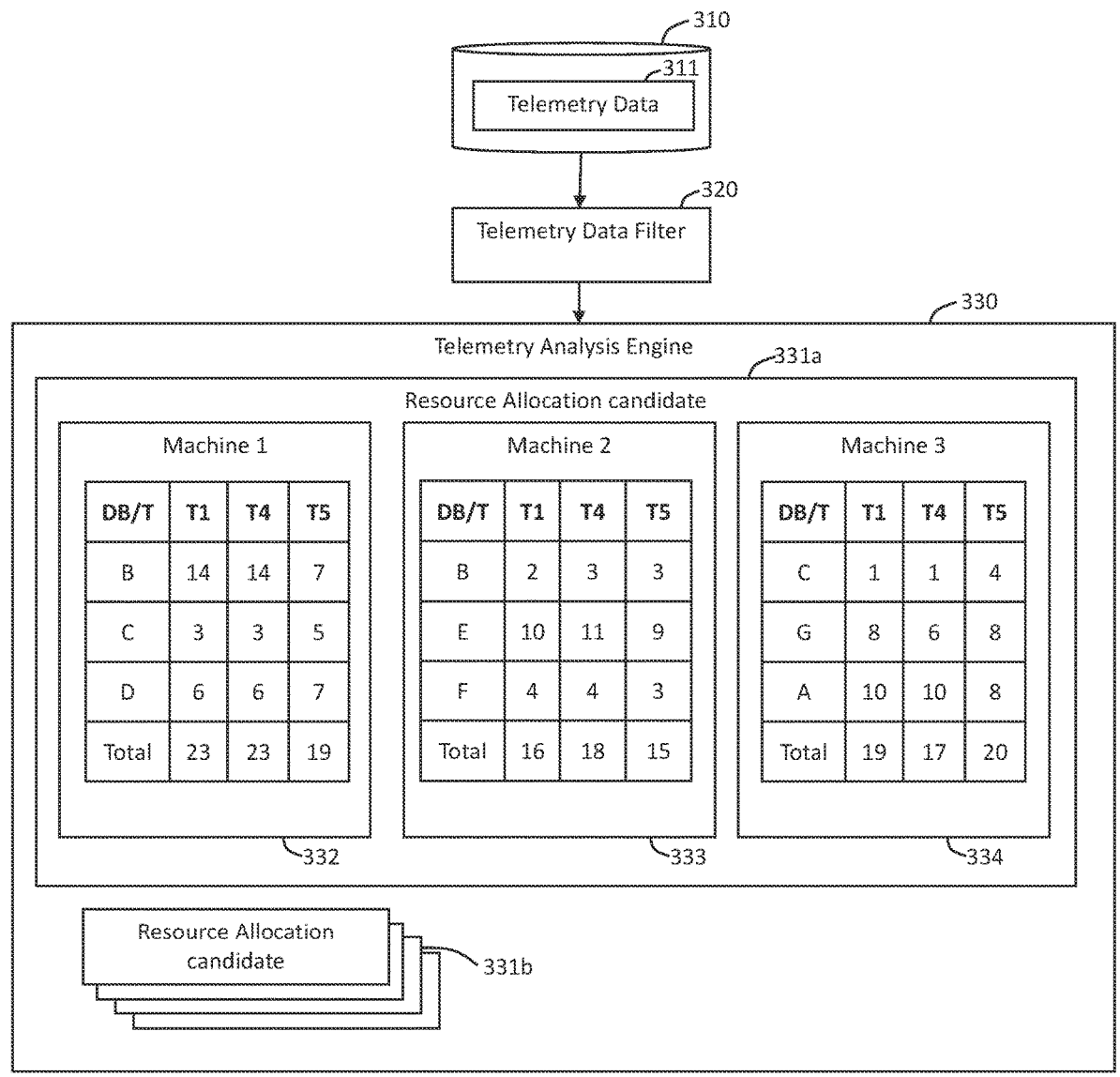

As illustrated in FIG. 3F, the telemetry data filter 320 provides filtered telemetry data to a telemetry analysis engine 330. The telemetry analysis engine 330 generates resource allocation candidates by adding/removing system components to/from the performance data associated with the machines and calculating a predicted performance of the machines. In the example illustrated in FIG. 3F, the telemetry analysis engine generates a resource allocation candidate 331a and a set of additional resource allocation candidates 331b. The resource allocation candidate 331a includes performance data 332 associated with a first computing machine (machine 1), performance data 333 associated with a second computing machine (machine 2), and performance data 334 associated with a third computing machine (machine 3). The performance data 332, 333, and 334 is obtained from the filtered performance data 318 for which subsumed time periods have been omitted by the telemetry data filter 320. In the resource allocation candidate 331a, the database A is reassigned from machine 1 to machine 3. Consequently, the telemetry analysis engine 330 calculates resource usage values that would result from reallocating resource-usage values of the CPUs of machine 3 to database A.

In the embodiment illustrated in FIG. 3F, the CPU-usage allocated to database A is reassigned from machine 1 to machine 3. In an alternative embodiment, resources allocated to a database that are assigned to multiple different machines may be reallocated to one machine. For example, as shown in FIG. 3F, machine 1 and machine 2 have CPUs assigned to database B. In one embodiment, the resource-usage may be reallocated from machine 1 and machine 2 to machine 3. In such an example, the resource usage measurements of the data 332 and 333 may be summed to generate the total resource usage for database B (i.e., 14+2, 14+3, and 7+3). According to yet another embodiment, resources allocated from one computer to one database may be split among multiple computers. For example, the telemetry analysis engine 330 may allocate resources from machine 2 and machine 3 to database A.

The additional set of resource allocation candidates 331b may include any number of permutations of databases A-G assigned to the machines, machine 1, machine 2, and machine 3. For example, one additional resource allocation candidate may swap database B with database G. Another may reassign database E to machine 3.

Each resource allocation candidate includes a reallocation of CPUs between existing databases and new databases, according to a predefined set of rules.

For example, the pre-defined set of rules may stipulate one or more of the following: (a) candidate allocations may not allocate resources from a resource-host having the highest-aggregate resource usage to a new database; (b) any candidate allocation may alter the CPU allocations of X number of resource hosts, where X is greater than 1 and less than all of the resource hosts, or (c) candidate allocations may not result in any time period having performance data in which aggregate resource usage values exceed a pre-defined threshold. Additional rules may specify that resources should be allocated among databases such that a variance of an aggregate-resource-usage value for every computing machine should be within a predetermined range of every other computing machine. Another rule may specify when the system should divide resource allocation between resources of two or more computing machines. For example, a rule may specify that if rules (a), (b), and (c), above, cannot all be met, the system should divide the allocation of resources for one or more databases among the resources of two or more computing machines.

Figure 3G:
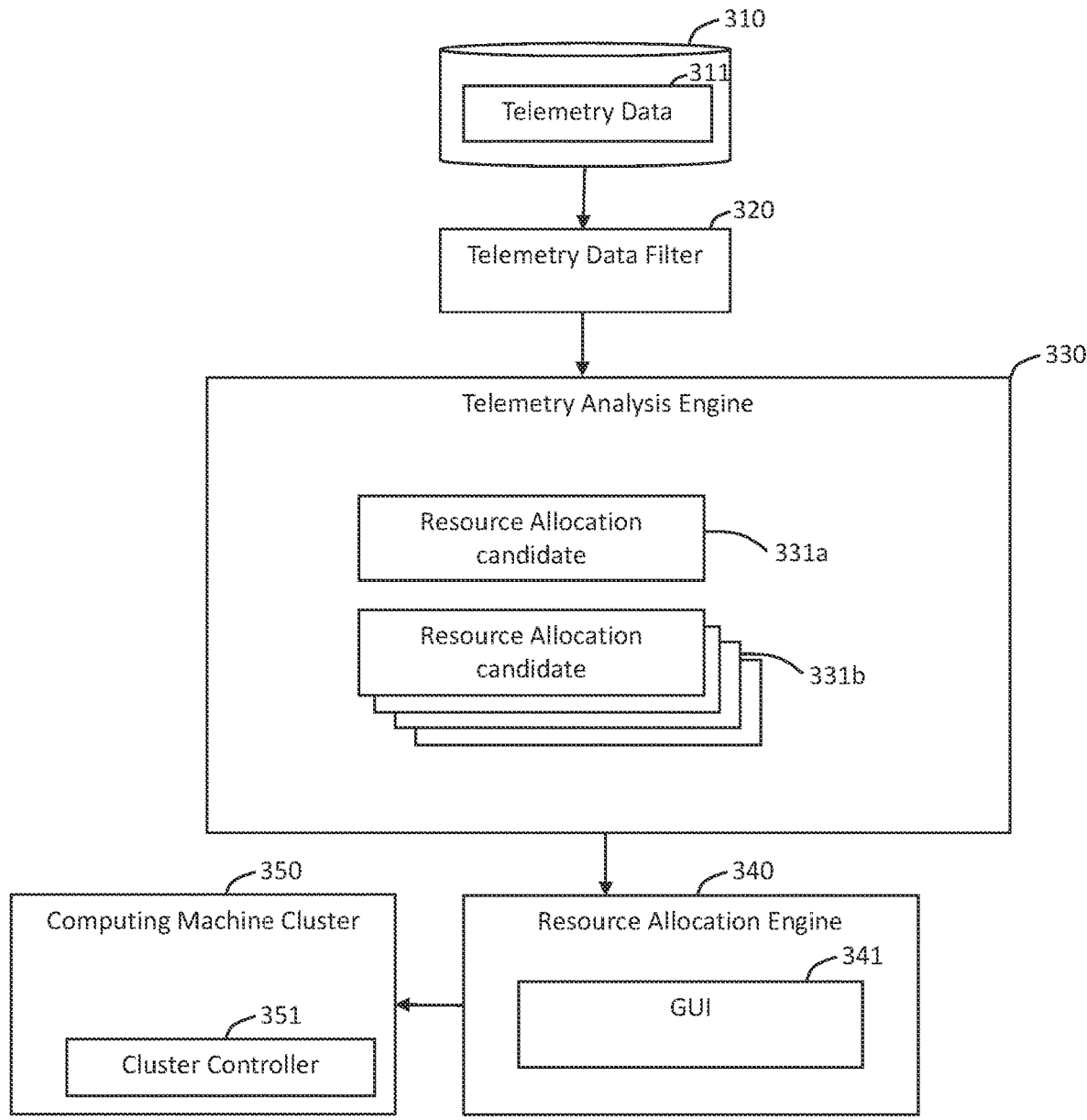

Referring to FIG. 3G, a resource allocation engine 340 selects one of the resource allocation candidates from among the candidate 331a and the set of additional candidates 331b to reallocate CPUs among the databases A-G.

The resource allocation engine 340 may select the candidate allocation of resources based on applying a set of rules, based on user input, or based on a combination of the two. For example, the system may select a candidate allocation of resources for which aggregate resource usage values for all the resource hosts has the smallest variation from a mean aggregate-resource-usage value. In the embodiment illustrated in FIG. 3G, the resource allocation engine 340 generates a graphical user interface (GUI) 341 present one or more resource allocation candidates to a user.

The resource allocation engine 340 allocates the resources to the system components according to the selection of the candidate allocation of resources. For example, the system may update a mapping table accessed by a cluster controller 351 of a computing machine cluster 350. The cluster controller 351 may direct incoming data traffic to an assigned computing machine based on the mapping of the databases managed by the computing machine cluster to the CPUs of the computing machines that manage operations associated with the databases.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
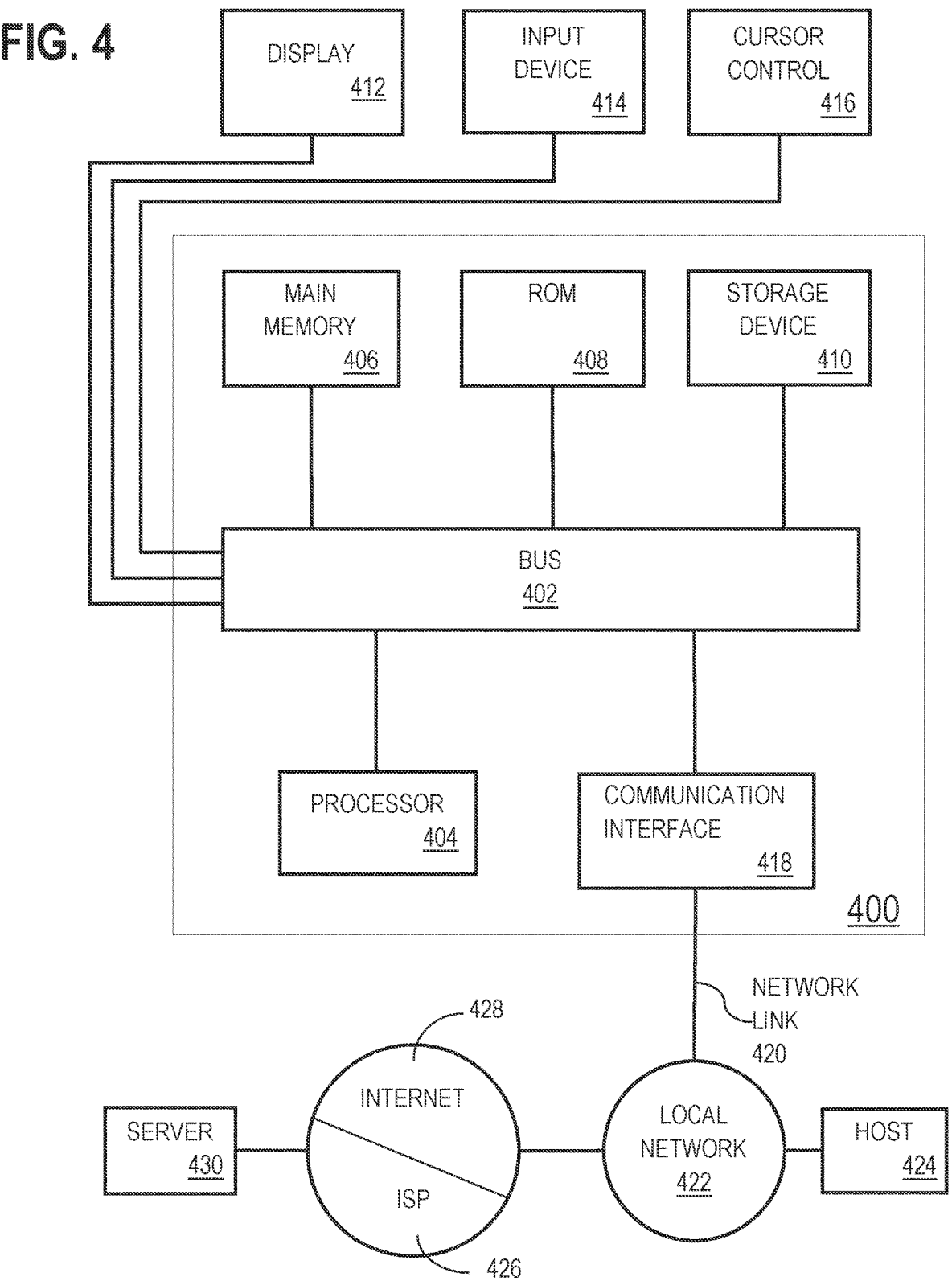
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
   obtaining telemetry data for a computing machine cluster comprising a plurality of data storage components and a plurality of data processing resources configured to execute transactions on the plurality of data storage components, the telemetry data corresponding to a plurality of time periods,
      wherein a first subset of the telemetry data, corresponding to a first time period of the plurality of time periods, comprises:
         a first set of values corresponding to data processing resource utilization associated with the plurality of data storage components during the first time period;
      wherein a second subset of the telemetry data, corresponding to a second time period of the plurality of time periods, comprises:
         a second set of values corresponding to data processing resource utilization associated with the plurality of data storage components during the second time period;
   for each particular data storage component, of the plurality of data storage components, determining that (a) the data processing resource utilization associated with the particular data storage component during the first time period was greater than or equal to (b) the data processing resource utilization by associated with the particular data storage component during the second time period; and
   responsive to the determining operation, generating a filtered set of the telemetry data that (a) includes the first set of values corresponding to data processing resource utilization by the plurality of data storage components during the first time period and (b) does not include the second set of values corresponding to the data processing resource utilization by the plurality of data storage components during the second time period; and
   allocating the plurality of data processing resources among the plurality of data storage components using the filtered set of telemetry data,
   wherein the plurality of data processing resources execute the transactions on the plurality of data storage components based on the allocation of the plurality of data processing resources among the plurality of data storage components.

2. The non-transitory computer readable medium of claim 1, wherein the instructions further cause performance of operations comprising:
   prior to determining that (a) the data processing resource utilization by the particular data storage component during the first time period was greater than or equal to (b) the data processing resource utilization by the particular data storage component during the second time period:
      calculating an aggregate value for data processing resource utilization across all components for each period of time among the plurality of time periods; and
      sorting the plurality of time periods according to the aggregate value for the data processing resource utilization for each respective time period;
   wherein determining that (a) the data processing resource utilization by the particular data storage component during the first time period was greater than or equal to (b) the data processing resource utilization by the particular data storage component during the second time period comprises:
      iteratively selecting for the first time period and the second time period, two periods of time, among the plurality of time periods, that (a) have not been compared to each other, and (b) have the highest aggregate values for data processing resource utilization.

3. The non-transitory computer readable medium of claim 1, wherein the data storage components are databases, and the data processing resources include central processing units (CPUs) utilized by the databases.

4. The non-transitory computer readable medium of claim 3, wherein the instructions further cause performance of operations comprising:
   assigning, using the filtered set of the telemetry data, a particular database to one or more computing machines among a plurality of computing machines, wherein each of the plurality of computing machines includes a number of CPUs for executing operations associated with respective sets of databases hosted by the respective computing machines.

5. The non-transitory computer readable medium of claim 1, wherein the instructions further cause performance of operations comprising:
   calculating an aggregate value for data processing resource utilization across all components for each period of time among the plurality of time periods; and
   generating a set of predicted aggregate values for data processing resource utilization for each time period in the filtered set of the telemetry data by calculating, for each time period in the filtered set of the telemetry data, a predicted aggregate value based on a sum of (a) a data processing resource utilization value for a particular component, and (b) the aggregate value.

6. The non-transitory computer readable medium of claim 5, wherein the instructions further cause performance of operations comprising:
based on the set of predicted aggregate values, assigning the particular data storage component to a particular computing machine among a plurality of computing machines, wherein the filtered set of the telemetry data corresponds to data processing resource utilization of the plurality of computing machines,
wherein assigning the particular data storage component to a particular computing machine is based on determining that a particular predicted aggregate value, among the set of predicted aggregate values, for the particular computing machine meets a threshold value.

7. The non-transitory computer readable medium of claim 1, wherein the telemetry data is obtained from a plurality of data sources including a plurality of sensors monitoring a plurality of electronic devices.

8. The non-transitory computer readable medium of claim 1, wherein the instructions further cause performance of operations comprising:
generating, for each respective period of time of the plurality of time periods, a count representing a number of other time periods, among the plurality of time periods, for which data processing resource utilization by each data storage component was less than, or equal to, data processing resource utilization by the respective each data storage component during the respective period of time; and
assigning a particular data storage component to a particular computing machine based on the count.

9. A method comprising:
obtaining telemetry data for a computing machine cluster comprising a plurality of data storage components and a plurality of data processing resources configured to execute transactions on the plurality of data storage components, the telemetry data corresponding to a plurality of time periods,
wherein a first subset of the telemetry data, corresponding to a first time period of the plurality of time periods, comprises:
a first set of values corresponding to data processing resource utilization associated with the plurality of data storage components during the first time period;
wherein a second subset of the telemetry data, corresponding to a second time period of the plurality of time periods, comprises:
a second set of values corresponding to data processing resource utilization associated with the plurality of data storage components during the second time period;
for each particular data storage component, of the plurality of data storage components, determining that (a) the data processing resource utilization associated with the particular data storage component during the first time period was greater than or equal to (b) the data processing resource utilization associated with the particular data storage component during the second time period; and
responsive to the determining operation, generating a filtered set of the telemetry data that (a) includes the first set of values corresponding to data processing resource utilization by the plurality of data storage components during the first time period and (b) does not include the second set of values corresponding to the data processing resource utilization by the plurality of data storage components during the second time period; and
allocating the plurality of data processing resources among the plurality of data storage components using the filtered set of telemetry data,
wherein the plurality of data processing resources execute the transactions on the plurality of data storage components based on the allocation of the plurality of data processing resources among the plurality of data storage components.

10. The method of claim 9, further comprising:
prior to determining that (a) the data processing resource utilization by the particular data storage component during the first time period was greater than or equal to (b) the data processing resource utilization by the particular data storage component during the second time period:
calculating an aggregate value for data processing resource utilization across all components for each period of time among the plurality of time periods; and
sorting the plurality of time periods according to the aggregate value for the data processing resource utilization for each respective time period;
wherein determining that (a) the data processing resource utilization by the particular data storage component during the first time period was greater than or equal to (b) the data processing resource utilization by the particular data storage component during the second time period comprises:
iteratively selecting for the first time period and the second time period, two periods of time, among the plurality of time periods, that (a) have not been compared to each other, and (b) have the highest aggregate values for data processing resource utilization.

11. The method of claim 9, wherein the data storage components are databases, and the data processing resources include central processing units (CPUs) utilized by the databases.

12. The method of claim 11, further comprising:
assigning, using the filtered set of the telemetry data, a particular database to a particular computing machine among a plurality of computing machines, wherein each of the plurality of computing machines includes a number of CPUs for executing operations associated with respective sets of databases hosted by the respective computing machines.

13. The method of claim 9, further comprising:
calculating an aggregate value for data processing resource utilization across all components for each period of time among the plurality of time periods; and
generating a set of predicted aggregate values for data processing resource utilization for each time period in the filtered set of the telemetry data by calculating, for each time period in the filtered set of the telemetry data, a predicted aggregate value based on a sum of (a) a data processing resource utilization value for a particular component, and (b) the aggregate value.

14. The method of claim 13, further comprising:
based on the set of predicted aggregate values, assigning the particular data storage component to a particular computing machine among a plurality of computing machines, wherein the filtered set of the telemetry data corresponds to data processing resource utilization of the plurality of computing machines, wherein assigning the particular data storage component to a particular computing machine is based on determining that a particular predicted aggregate value, among the set of predicted aggregate values, for the particular computing machine meets a threshold value.

15. The method of claim 9, wherein the telemetry data is obtained from a plurality of data sources including a plurality of sensors monitoring a plurality of electronic devices.

16. The method of claim 9, further comprising:

generating, for each respective period of time of the plurality of time periods, a count representing a number of other time periods, among the plurality of time periods, for which data processing resource utilization by each data storage component was less than, or equal to, data processing resource utilization by the respective each data storage component during the respective period of time; and assigning a particular data storage component to a particular computing machine based on the count.

17. A system comprising:

one or more processors; and memory storing instructions that, when executed by the one or more processors, cause the system to perform operations comprising:

obtaining telemetry data for a computing machine cluster comprising a plurality of data storage components and a plurality of data processing resources configured to execute transactions on the plurality of data storage components, the telemetry data corresponding to a plurality of time periods, wherein a first subset of the telemetry data, corresponding to a first time period of the plurality of time periods, comprises:

a first set of values corresponding to data processing resource utilization associated with the plurality of data storage components during the first time period;

wherein a second subset of the telemetry data, corresponding to a second time period of the plurality of time periods, comprises:

a second set of values corresponding to data processing resource utilization associated with the plurality of data storage components during the second time period;

for each particular data storage component, of the plurality of data storage components, determining that (a) the data processing resource utilization associated with the particular data storage component during the first time period was greater than or equal to (b) the data processing resource utilization associated with the particular data storage component during the second time period; and responsive to the determining operation, generating a filtered set of the telemetry data that (a) includes the first set of values corresponding to data processing resource utilization by the plurality of data storage components during the first time period and (b) does not include the second set of values corresponding to the data processing resource utilization by the plurality of data storage components during the second time period; and allocating the plurality of data processing resources among the plurality of data storage components using the filtered set of telemetry data, wherein the plurality of data processing resources execute the transactions on the plurality of data storage components based on the allocation of the plurality of data processing resources among the plurality of data storage components.

18. The system of claim 17, wherein the instructions further cause the system to perform operations comprising:

prior to determining that (a) the data processing resource utilization by the particular data storage component during the first time period was greater than or equal to (b) the data processing resource utilization by the particular data storage component during the second time period:

calculating an aggregate value for data processing resource utilization across all components for each period of time among the plurality of time periods; and sorting the plurality of time periods according to the aggregate value for the data processing resource utilization for each respective time period;

wherein determining that (a) the data processing resource utilization by the particular data storage component during the first time period was greater than or equal to (b) the data processing resource utilization by the particular data storage component during the second time period comprises:

iteratively selecting for the first time period and the second time period, two periods of time, among the plurality of time periods, that (a) have not been compared to each other, and (b) have the highest aggregate values for data processing resource utilization.

19. The system of claim 17, wherein the data storage components are databases, and the data processing resources include central processing units (CPUs) utilized by the databases.

20. The system of claim 19, wherein the instructions further cause the system to perform operations comprising:

assigning, using the filtered set of the telemetry data, a particular database to a particular computing machine among a plurality of computing machines, wherein each of the plurality of computing machines includes a number of CPUs for executing operations associated with respective sets of databases hosted by the respective computing machines.

* * * * *

UNITED STATES PATENT AND TRADEMARK OFFICE
CERTIFICATE OF CORRECTION

| | | |
|---|---|---|
| PATENT NO. | : 12,099,426 B2 | Page 1 of 1 |
| APPLICATION NO. | : 17/452459 | |
| DATED | : September 24, 2024 | |
| INVENTOR(S) | : Griffin | |

It is certified that error appears in the above-identified patent and that said Letters Patent is hereby corrected as shown below:

In the Claims

In Column 25, Line 65, in Claim 1, after "utilization" delete "by"

Signed and Sealed this
Fourteenth Day of January, 2025

Derrick Brent
*Acting Director of the United States Patent and Trademark Office*